US005491471A

United States Patent [19]

Stobbe

[11] Patent Number: 5,491,471

[45] Date of Patent: Feb. 13, 1996

[54] ACCESS CONTROL SYSTEM WHERE THE CARD CONTROLS THE TRANSMISSION FORMAT OF THE CARD READER

[76] Inventor: Anatoli Stobbe, Steinradweg 3, D-3013 Barsinghausen 2, Germany

[21] Appl. No.: 964,776

[22] Filed: Oct. 22, 1992

[30] Foreign Application Priority Data

Oct. 23, 1991 [DE] Germany .......................... 41 34 922.9

[51] Int. Cl.$^6$ ............................ G06F 7/06; G05B 23/00; H04Q 3/02

[52] U.S. Cl. ............................ 340/825.340; 340/825.31; 340/825.54; 340/825.07

[58] Field of Search ......................... 340/835.31, 825.34, 340/825.54, 572, 825.69, 825.7, 825.07; 382/2

[56] References Cited

U.S. PATENT DOCUMENTS

| | | | |
|---|---|---|---|
| 3,944,928 | 3/1976 | Augenblick et al. . | |
| 3,959,633 | 5/1976 | Lawrence et al. . | |
| 4,144,523 | 3/1979 | Kaplit | 340/825.31 |
| 4,384,288 | 5/1983 | Walton . | |
| 4,711,995 | 12/1987 | Genest | 235/382 |
| 4,801,786 | 1/1989 | Stobbe . | |
| 4,822,990 | 4/1989 | Tamada et al. | 340/825.31 |
| 4,924,210 | 5/1990 | Matsui et al. . | |
| 4,980,913 | 12/1990 | Skret | 340/825.07 |
| 5,036,308 | 7/1991 | Fockens . | |
| 5,099,226 | 3/1992 | Andrews | 340/572 |
| 5,105,190 | 4/1992 | Kip et al. . | |
| 5,168,520 | 12/1992 | Weiss | 340/825.31 |
| 5,175,370 | 12/1992 | Murai | 340/825.07 |
| 5,193,114 | 3/1993 | Moseley | 340/825.34 |
| 5,218,343 | 6/1993 | Stobbe et al. | 340/825.34 |

FOREIGN PATENT DOCUMENTS 4003140 8/1991 Germany .

OTHER PUBLICATIONS

"Hughes Identification Devices ProxGuard vs. ProxCard Readers" (Hughes Publication), published in connection with a Trade Show taking place Sep. 14–16, 1992.

*Primary Examiner*—Donald J. Yusko
*Assistant Examiner*—David Jung
*Attorney, Agent, or Firm*—Collard & Roe

[57] ABSTRACT

An access control system for controlling access of individuals to an area having at least one programmed data carrier. Each programmed data carrier is assigned to an individual and has a programmed memory including a predetermined number of active bits within a bit allocation map defining authorization data specific to the individual. The programmable memory also has control data including an entry representative of the predetermined number. A stationary reading device is installed adjacent to the area for receiving the control and authorization data from the data carrier. The stationary reading device has uninitialized and unprogrammed programmable reader memory. A central evaluation unit includes check data and is coupled to the stationary reading device. The control data programs the reader memory so that the reading device recognizes the predetermined number and relays authorization data unaltered to the central evaluating unit. The central evaluating unit allows access to the area if the authorization data matches the check data.

15 Claims, 3 Drawing Sheets

ACCESS CONTROL SYSTEM WHERE THE CARD CONTROLS THE TRANSMISSION FORMAT OF THE CARD READER

BACKGROUND OF THE INVENTION

1. Field of the Invention

The present invention relates to an access control system for controlling access of individuals to an area. More particularly, it relates to a system having a programmed data carrier which is capable of programming a stationary reading device to recognize the format and length of the data carrier's authorization data.

2. The Prior Art

Control systems are known which permit only authorized persons to have access to certain objects or areas, for example, buildings or rooms etc. The main components of such a control system are a data carrier with a programmable memory and a reading device for receiving wireless transmissions of data from the data carrier. The reading device evaluates the data and passes it along to a central evaluating unit. The central evaluating unit compares the authorization data to see if it conforms to the check data stored in the evaluating unit. If the authorization data and the check data match, the evaluating unit allows access to the object or area, for example, by unlocking a door, so that the authorized person can enter the room. One such system is described in Andrews, U.S. Pat. No. 5,099,226.

The data carriers used with such control systems are often referred to as transponders or detection microchips which are known, for example, from DE 40 03 410A 1, which corresponds to Applicant's co-pending U.S. patent application Ser. No. 07/650,490 filed Feb. 5, 1991. Typically, these data carriers are the size of a credit card and include a chip with a programmable readout data memory and an antenna as main components. Magnetic cards with magnetic memory or other types of data carriers may also be used. The data carrier is carried by the authorized person and is brought close to the reading device for wireless data transmission of the data stored on the data carrier to the reading device, where it is further evaluated. The reading device is stationarily mounted, for example, near the frame of a door of a building or room. The door is opened if the authorization data on the data carrier provides clearance for the individual to the object or area.

Data carriers are available with different memory sizes. The size of the memory and the way it is divided, i.e., the bit allocation map, are determined according to the specific requirements of the customer. The bit allocation map includes several groups of individual bits, with each group providing a special identification code in order to control various authorization functions.

The structure of a bit allocation map usually includes, for example, a country identification, an installation identification (facility/site code), the card number of the respective carrier and, if necessary, additional bits as check digits for added security. All of these bits together form the useful or active bits of the authorization data which are transmitted from the data carrier to the reading device. Depending on the scope of the identification data, the number of bits in the bit allocation map may vary. The size of the memory is determined by the number of bits. After the bit allocation map (bit format) has been defined according to the customer's specification, or the requirements of the object or area to be safeguarded, the data carriers and the reading devices are programmed accordingly by the manufacturers. Programming all of the reading devices and data carriers requires considerable time and expense. Customer-specific programming of the reading devices makes it impossible to mass-produce and stock reading devices, which is economical.

Only after the desired bit allocation map is known can the manufacturer program the reading devices and provide the unique software that permits the reading device to correctly read and evaluate the data transmitted from the data carrier and to relay the useful or active bits to the connected evaluating unit.

In order to meet all types of customer requirements, the manufacturer designs the memory capacity so that the maximum number of useful bits are available. If it is discovered that a customer requires less than the total number of bits for the bit allocation map, the remaining inactive bits would nonetheless be transmitted to the reading device and relayed to the evaluating unit during the operation. Since these superfluous bits cannot be processed or evaluated by the evaluating unit, it is necessary to suppress these bits.

This creates a problem in that the reading devices must be programmed with special software in accordance with customer specifications, which is costly and increases delivery time. This special software to program the reading devices is necessary so that the reading device can correctly process and relay only the active bits of the bit allocation map as it is received. In case that the bit allocation map (bit format) is changed or if data carriers are added, the firmware in the reading device has to be changed.

SUMMARY OF THE INVENTION

It is therefore an object of the present invention to overcome the aforementioned drawbacks of the prior art and to provide an access control system which does not require pre-programming of the reading devices prior to installation.

It is a further object of the present invention to provide an access control system where the reading devices are programmed by the data carriers.

These and other related objects are achieved according to the invention by an access control system for controlling access of individuals to an area including at least one programmed data carrier. Each programmed data carrier is assigned to an individual and has a programmable memory. The programmable memory includes a predetermined number of active bits within a bit allocation map (bit format) defining authorization data specific to the individual and control data including an entry representative of the predetermined number. A stationary reading device is installed adjacent to the area for receiving control data and authorization data from the data carrier. The stationary reading device has uninitialized and unprogrammed programmable reader memory. A central evaluating unit including check data and access means is coupled between the stationary reading device and the access means. The control data programs the reader memory so that the reading device recognizes the predetermined number and relays the authorization data unaltered to the central evaluating unit. The central evaluating unit will then direct the access means to allow access to the area if the authorization data matches the check data.

The system according to the invention requires programming of the data carrier according to customer specifications. However, an important advantage of the invention lies in that it is not necessary to program the associated reading devices. Surprisingly, it was found that it is possible to install and to use reading devices without pre-programming.

The reading device according to the invention is programmed by the data carrier which has been previously programmed with all of the required data. The use of unprogrammed or uninitialized reading devices is advantageous in that the reading devices can now be produced in large numbers by the manufacturer and can be stocked by the customer and available for immediate installation and use as required. The customer can conveniently install the reading devices in different systems.

The data carriers are programmed with control data in addition to the authorization data. The control data contains an entry which represents the number of active bits of the authorization data. The uninitialized reading device or its memory is programmed by the control data so that it can recognize the preselected number and pass the active bits on to the central evaluating unit unaltered.

The data transmission from the data carrier to the reading device programs or initializes the reading device and places it in a mode of operation where it can recognize the relevant useful bits and pass them on to the evaluating unit.

In subsequent reading steps, the previous data which is stored by the reading device as erasable data, is overwritten. Therefore, the data transmitted by the data carrier is not permanently or retrievably stored in memory of the reading device. RAM-type memory can be accordingly used for the reading device.

The unprogrammed reading devices can be used in conjunction with a wide variety of data carriers. According to the invention, the data carriers which previously were pre-programmed are additionally pre-programmed with the control data. However, the invention eliminates the need for pre-programming the reading devices.

In a further embodiment of the invention, the control data additionally contains entries representing the output format of the active bits of the authorization data. The data carrier can therefore be programmed to select one of various output formats. Different output formats can thus be adapted to different evaluating units.

According to a further embodiment of the invention, the control data additionally contains test data for testing the reading device. For example, signals which are relayed from the reading device to the central evaluating unit can be measured by a known bit pattern. In addition, a hardware test can be conducted, for example, by checking the control LEDs on the reading device.

In yet another embodiment of the invention, the control data additionally contains customer data representing a defined customer number. The memory of the reading device is provided with unprogrammed fixed storage (EEPROM= electrical erasable programmable read-only memory), into which the customer data is written once, during the first transmission from the data carrier, and is preserved there permanently. Ideally, the safety of the control system can be increased by the use of a permanently assigned customer number. In this manner, access to certain secured rooms can be obtained only with a data carrier having a customer number which corresponds to the customer number stored in fixed memory of the reading device. Any misuse of data carriers by another customer having another customer number is therefore eliminated.

BRIEF DESCRIPTION OF THE DRAWINGS

Other objects and features of the present invention will become apparent from the following detailed description considered in connection with the accompanying drawings, which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
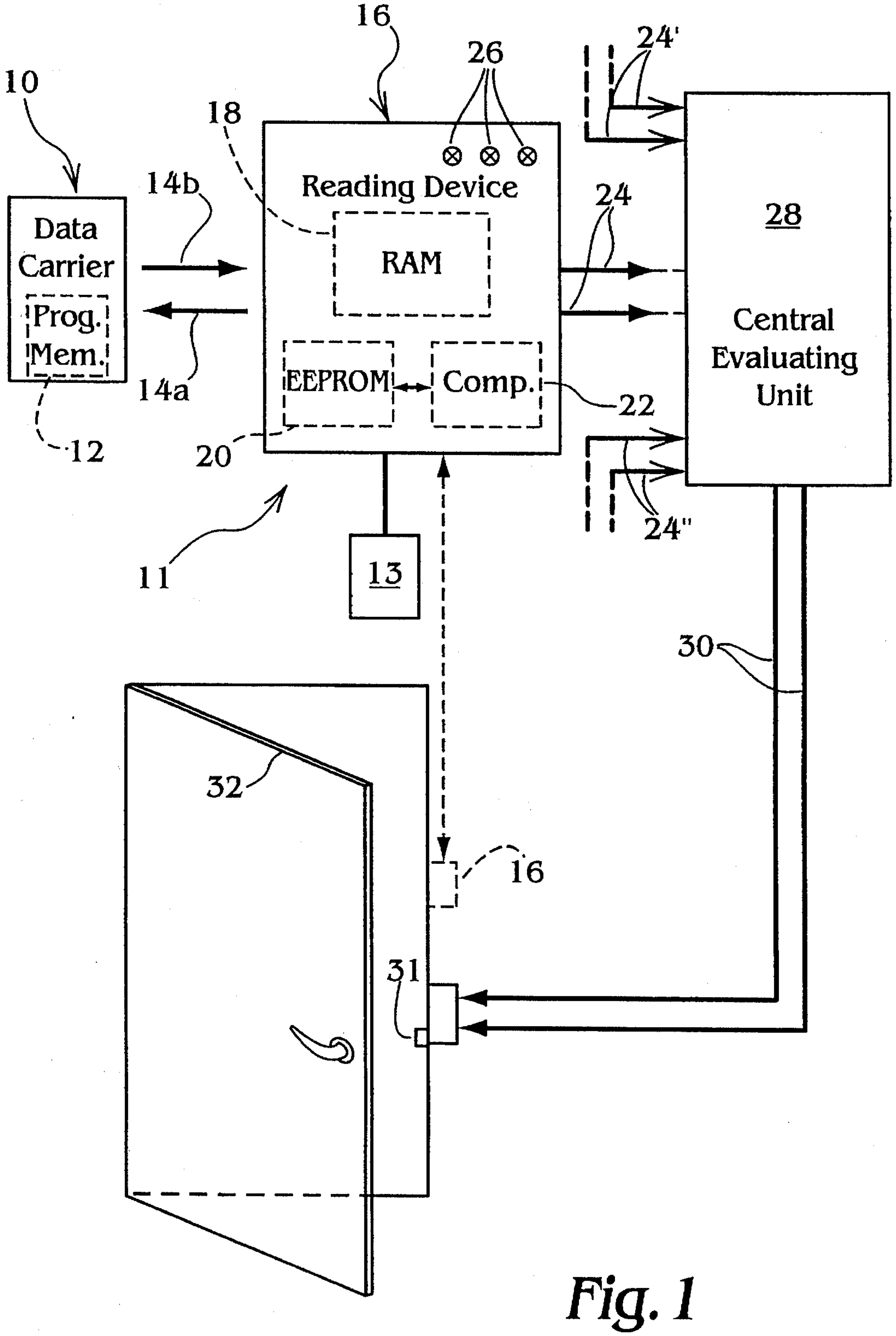
FIG. 1 is a schematic view of the access control system according to the invention.

Referring now to the drawings and in particular FIG. 1, there is shown an overview of the access control system 11 according to the invention, including a data carrier 10 having a programmable memory 12. Data carrier 10 may be of a type described in Applicant's co-pending U.S. patent application Ser. No. 07/650,490 filed Feb. 5, 1991, the subject matter of which is incorporated herein by reference. A stationary reading device 16 is installed adjacent a door 32 and is connected to a power source 13. Door 32 is ordinarily locked to protect a "secured area." Reading device 16 includes a reader memory 18 which is RAM memory, for example, and a read-only memory 20, which is an EEPROM, for example. Reading device 16 also includes a comparator 22 and several function lamp 26, for example LEDs, which visually signal the operating condition and other functions of reading device 16.

Data lines 24 couple reading device 16 to a central evaluating unit 28. Central evaluating unit 28 may be coupled to several reading devices, similar to reading device 16, for example, through data lines 24' and 24". Lines 30 lead from evaluating unit 28 to access means in the form of a door lock 31, for example, of door 32. Door lock 31 is released only if the data carrier provides clearance to the secured area. A release signal is relayed along line 30 to lock 31 to open door 32.

Data carrier 10 is brought within RF coupling proximity to reading device 16 so that energy is transmitted from reading device 16 to data carrier 10 as indicated by arrow 14*a*. RF energy is stored by data carrier 10 for use in transmitting the return signal to reading device 16. Once data carrier 10 has been powered, a wireless transmission of data occurs from data carrier 10 to reading device 16, as indicated by arrow 14*b*. This transmission, for example, an RF transmission, includes a data record 46 as shown in FIG. 3.

The manner in which reading device 16 receives data will be explained in greater detail below. Subsequently, only authorization data 34 from data record 46 is relayed to evaluating unit 28 via data lines 24. Evaluating unit 28 compares the authorization data with the check data stored therein for conformity. If the authorization data matches the check data, a release signal is transmitted to lock 31 via line 30.

Figure 2:
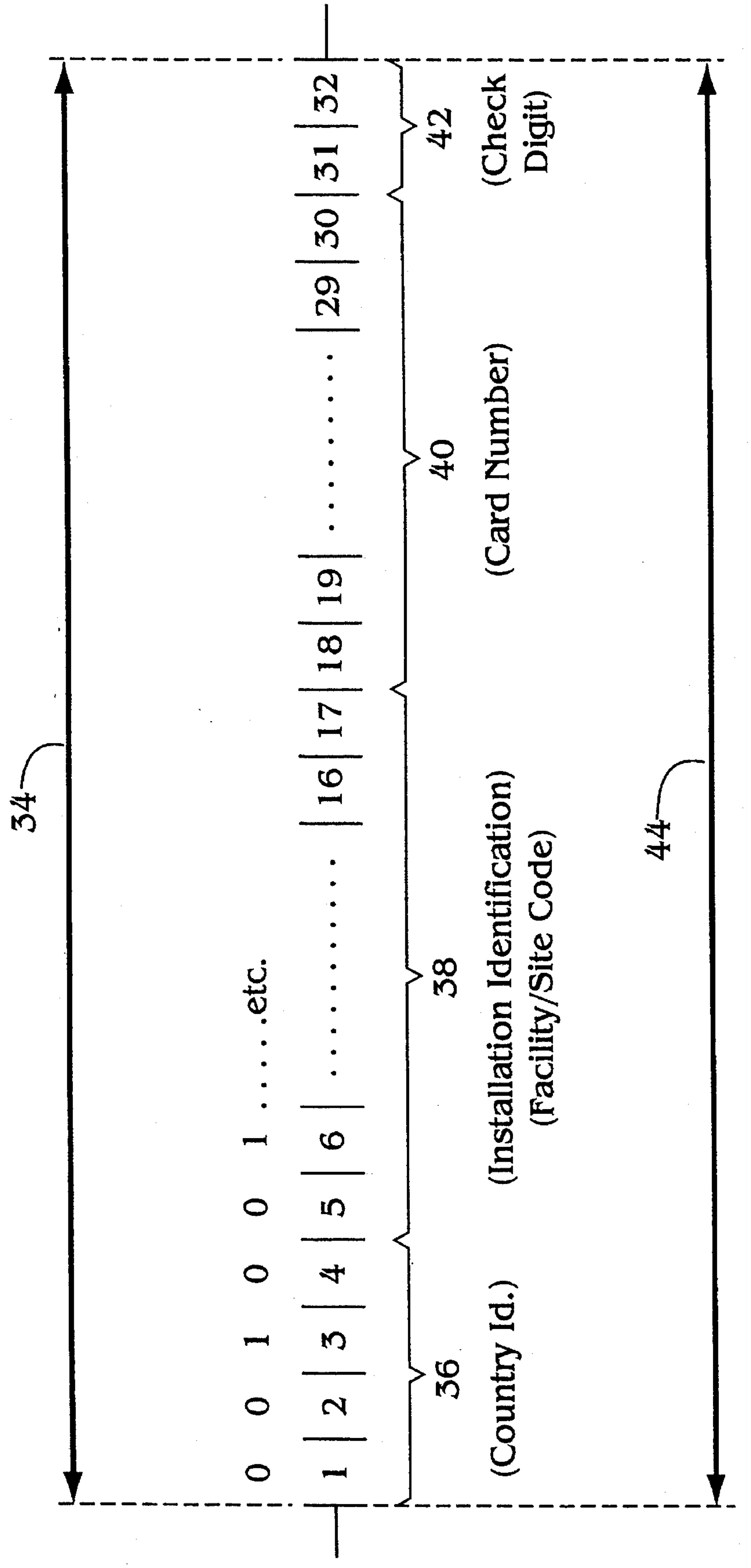
FIG. 2 is a diagram showing the structure of the authorization data.
Figure 3:
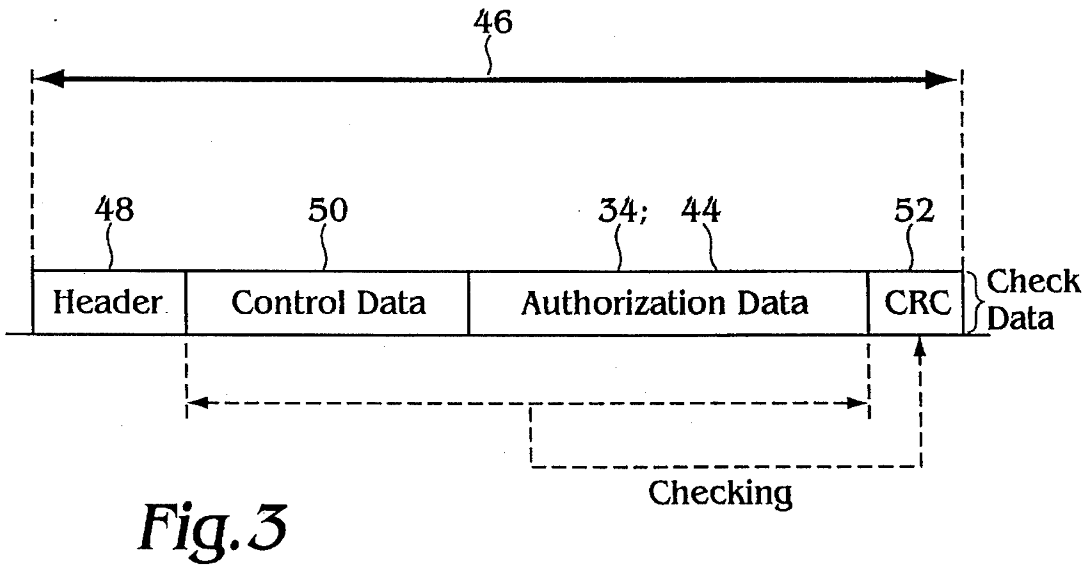
FIG. 3 is a diagram showing the structure of the complete data record of the data carrier.

Referring to FIG. 3, there is shown a data record 46 having four data blocks: header 48; control data 50; authorization data 34; and check-bit sequence, check data or CRC (cyclic redundancy check) 52. The contents or fields of control data 50 are shown in further detail in FIG. 4. The contents or fields of authorization data 34 are shown in further detail in FIG. 2.

FIG. 2 shows an example of a bit allocation map which can be created based on a customer's request to safeguard certain objects or areas. The bit allocation map includes 32 bits which are active bits 44 or authorization data 34. The bit allocation pattern or bit format generally defines the number, the position and the meaning of the bits.

The first four identification bits describe a country identification 36 and define a country in which the data carrier will be used. The next group of 13 bits (from bit No. 5 to bit No. 17) includes installation identification (facility/site code) 38 to identify the actual installation. Since 13 bits are used, 8,192 different bit combinations are possible to identify the installation (facility/site), i.e. $2^{13}$. Therefore, a large number of different control systems can be created. It should be understood that many alternatives exist as to the assignment of various records, fields and bits, all of which are contemplated by this invention.

Installation identification bits 38 are followed by 13 additional bits labeled card number 40, which permits 8,192 different card numbers, i.e. $2^{13}$. Thus, 8,192 different data carriers can be used on one control system. Card number 40 is followed by a check digit 42 including two check bits. Check digit 42 can be used, for example, to check the correct structure of the bit allocation map (bit format). Each bit is represented either by a "0" or a "1" as is well known in the art. The bit allocation pattern is therefore represented as a sequence of zero's and one's.

The bit allocation pattern can be defined according to customer specifications. Previously, both data carrier 10 and reading device 16 were programmed according to customer specifications. However, according to the invention, unprogrammed reading devices with RAM memory can be used which are programmed by the data carrier. As can be seen in FIG. 3, header 48 is initially transmitted to reading device 16 for synchronization. Next, control data 50 is transmitted to reading device 16. This is followed by active bits 44 which form authorization data 34. Finally, check data 52 is transmitted so that control data 50 and authorization data 34 can be checked in a manner known in the computer art.

Figure 4:
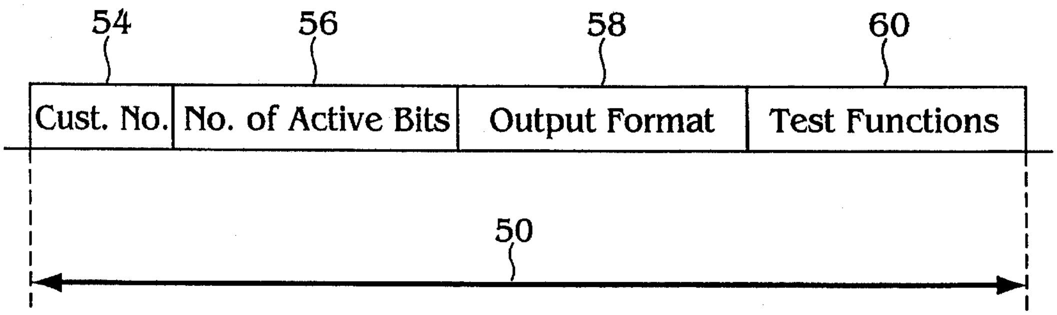
FIG. 4 is a diagram showing the structure of the control data.

Control data 50 instructs reading device 16 as to the proper format or number of active bits of authorization data 34 so it can be transmitted unaltered to central evaluating unit 28. The beginning of authorization data 34, with respect to data record 46, can be set in data carrier 10 and reading device 16 initially, or it can be transmitted to reading device 16 by control data 50. The structure of control data 50 is schematically shown in FIG. 4 and includes four fields, for example, customer number 54, number of active bits 56, output format 58 and test function 60. The number of active bits 56 would indicate 32 active bits for the bit allocation pattern of authorization data 34 shown in FIG. 2.

Output format 58 indicates which of several output formats are used for authorization data 34. Output format 58 is interpreted by reading device 16, which then transmits authorization data 34 to central evaluating unit 28 via data lines 24 in the proper output format. Different output formats are known by those skilled in the art. The output format for authorization data 34 from FIG. 2, for example, is a linear string containing 32 bits with four fields of length 4, 13, 13 and 2, respectively.

Test functions 60 provide information to check reading device 16 or to test signals transmitted over lines 24 with the use of known bit patterns. Preferably, special data carriers are used to carry out various test functions. Although test functions are known, transmitting number of active bits 56 and output format 58 to reading device 16 along with test function 60 as part of control data 50 is unique.

Number of active bits 56, output format 58 and test functions 60 are treated by reading device 16 as variable or erasable data. The information transmitted by these fields are overwritten when a subsequent wireless transmission takes place from data carrier 10 to reading device 16. For this reason, RAM memory can be used for reading device memory 18.

Control data 50 enables reading device 16 to correctly receive the actual authorization data 34, formed by active bits 44, from data carrier 10. Reading device 16 can then transmit the data to central evaluating unit 28 in an unaltered form. Therefore, control data 50 programs a mode of operation for reading device 16 that corresponds to a mode of operation of pre-programmed reading devices. As a result, different modes of operation can be programmed by different data carriers, a result which cannot be achieved with pre-programmed reading devices.

As shown in FIG. 4, control data 50 includes an information data record 54 which represents a predetermined customer number or other allocation number. Reading device 16 includes fixed storage 20, for example, an EEPROM in which customer number 54 is written once during the first data transmission from data carrier 10. Thereafter, customer number 54 is permanently stored in fixed storage 20. Thus, customer number 54 is written into the initially unprogrammed reading device 16 only once.

Customer number 54 assures that reading device 16 responds exclusively to data carriers 10, whose customer number 54 matches the customer number stored in fixed storage 20. If the customer numbers match, reading device 16 will receive the remainder of information from data carrier 10 and relay it to central evaluating unit 28. Otherwise, the information on data carrier 10 will not reach central evaluating unit 28 and access will be denied. Alternatively, reading device 16 could relay an error or warning message to central evaluating unit 28, indicating, for example, that an individual is attempting access to an area which he is not authorized to enter.

Also, the access control system described herein allows central evaluating unit 28 to keep a complete record of ingress and egress from all secured areas. Such information is useful to assist in scheduling, security, etc. Furthermore, it reduces the risk of employee theft if employees are aware that their movements are recorded by central evaluating unit 28. Such a procedure prevents unauthorized use of data carriers 10.

As can be seen in FIG. 1, reading device 16 includes a comparator circuit 22 which compares the customer number contained on data carrier 10 with the customer number contained in fixed storage 20. Only if the customer numbers match will reading device 16 activate and relay authorization 34 to central evaluating unit 28.

Data carrier 10 may be powered by placing it within RF coupling proximity to reading device 16. Data carrier 10 receives an RF signal from reading device 16 to activate and/or power it. Data carrier 10 then transmits the control data and authorization data to reading device 16 via an RF signal, for example.

The invention also contemplates a method for controlling access of individuals to an area including the steps of transmitting control data 50 and authorization data 34 from data carrier 10 to reading device 16 via an RF signal. Stationary reading device 16 is programmed with control data 50 to recognize the format of authorization data 34. Authorization data 34 is then relayed to central evaluating unit 28 unaltered. Authorization data 34 is compared with check data contained within central evaluating unit 28. Central evaluating unit 28 allows access to the area if authorization data 34 matches the check data.

Additional steps include placing data carrier 10 in RF coupling proximity to reading device 16 and transmitting an RF signal from reading device 16 to data carrier 10 to power the data carrier. Also, the reading device can be initialized by permanently storing a customer number in a one time programmable memory 20. Reading device 16 would then relay authorization data 34 to central evaluating unit 28 only if control data 50 includes customer number 54 which matches the stored customer number.

While only one embodiment of the present invention has been shown and described, it is to be understood that many changes and modifications may be made thereunto without departing from the spirit and scope of the invention as defined in the appended claims.

What is claimed is:

1. An access control system for controlling access of individuals to an area comprising:

at least one programmed data carrier, each programmed data carrier being assigned to an individual and having a programmable memory including i. bits in a predetermined format defining authorization data, said predetermined format and said authorization data being specific to the individual and the area; and ii. control data identifying said predetermined format;

a stationary reading device installed adjacent to the area for receiving control data and authorization data from said data carrier, said stationary reading device having uninitialized and unprogrammed programmable reader memory, said reader memory being programmable to identify one of a variety of different formats;

locking means installed adjacent to the area for controlling acess to the area; and central evaluating means including check data, said central evaluating means coupled to said stationary reading device and said locking means;

said reading device reading said data carrier with said control data programming said reader memory to read and transmit only the bits in the predetermined format, so that said reading device relays said authorization data unaltered to said central evaluating means, whereby if said authorization data matches said check data, said central evaluation means instructs said locking means to allow access to the area.

2. The access control system according to claim 1, wherein said programmed data carriers are transponders.

3. The access control system according to claim 2, wherein said bits in the predetermined format define a bit allocation map and said control data includes entries representative of the output format of said allocation map.

4. The access control system according to claim 3, wherein said control data additionally includes test data for testing said reading device.

5. The access control system according to claim 4, wherein said control data additionally includes customer data representing a customer number.

6. The access control system according to claim 5, wherein said reader memory includes unprogrammed fixed storage (EEPROM=electrical erasable programmable read-only memory), said unprogrammed fixed storage being programmed by writing said customer number ONCE to said fixed storage where it is permanently stored (one shot).

7. The access control system according to claim 6, wherein said unprogrammed fixed storage is an EEPROM.

8. The access control system according to claim 7, wherein said reading device includes means for comparing said permanently stored customer number with said customer number received from said data carrier, said reading device transmitting said authorization number to said central evaluating means if said permanently stored customer number matches said customer number received from said data carrier.

9. The access control system according to claim 8, wherein said data carrier is placed within RF coupling proximity of said stationary reading device to receive an RF signal for powering said data carrier.

10. The access control system according claim 9, wherein said data carrier transmits said control data and said authorization data to said stationary reading device via an RF signal.

11. A method for controlling access of individuals to an area comprising the steps of:

transmitting control data and authorization data in a predetermined format from a data carrier to a stationary reading device via an RF signal, said reading device being programmable to identify one of a variety of formats;

programming the stationary reading device with the control data to recognize the predetermined format of the authorization data;

relaying the authorization data to a central evaluating unit unaltered;

comparing the authorization data to check data contained within the central evaluating unit; and instructing locking means to allow access to the area if the authorization data matches the check data.

12. The method for controlling access according to claim 11, additionally including the steps of:

placing a data carrier within RF coupling proximity of a stationary reading device; and transmitting an RF signal from the stationary reading device to the data carrier to power the data carrier, prior to said step of transmitting control data and authorization data.

13. The method for controlling access according to claim 12, additionally including the step of:

initializing the reading device by permanently storing a customer number in reading device memory, prior to said step of programming the stationary reading device; and said step of relaying the authorization data includes relaying the authorization data to the central evaluating unit unaltered if the control data includes a customer number matching the customer number stored in the reading device memory.

14. An access control system for controlling access of individuals to different areas, comprising:

at least one portable, programmable RF transponder, each portable, programmable RF transponder being assigned to and carried by an individual and storing:

i. allocation data;

ii. control data identifying an authorization data format and a predetermined number of active bits within said authorization data format;

iii. authorization data comprising a predetermined number of active bits organized in said authorization data format a plurality of reading devices, each reading device corresponding to one of the different areas and including:

i. an EEPROM, containing an allocation code and a comparator;

ii. a RAM memory for storing said control data;

iii. transmission means programmable by said control data stored within said RAM memory for transmitting said authorization data;

central evaluation means including check data;

a first data communication line connecting each of said reading devices to said central evaluation means;

a locking device assigned to each of said reading devices for restricting access to the corresponding area;

a second data communication line connecting each locking device to said central evaluation means;

wherein said portable, programmable RF transponder is brought within RF coupling proximity to one of said reading devices so that energy is transmitted from said one reading device to said portable, programmable RF transponder;

wherein said allocation data is transmitted to said one reading device and said comparator compares said received allocation data with said allocation code contained within said EEPROM;

upon a favorable comparison, said control data is transmitted from said portable, programmable RF transponder and stored within said RAM memory;

said control data programming said transmission means to transmit the predetermined number of active bits of said authorization data in said authorization data format to said central evaluation means over said first data communication line without random fill characters;

wherein said central evaluation means compares said received authorization data to said check data, upon a favorable comparison, said central evaluation means instructs said assigned locking device, over said second data communication line, to provide access to the corresponding area.

15. A method of controlling access of individuals to different areas, comprising the steps of:

positioning a portable, programmable RF transponder within RF coupling proximity to a reading device assigned to one of the different areas so that energy is transmitted from said reading device to said portable, programmable RF transponder;

transmitting allocation data from said portable, programmable RF transponder to said reading device;

comparing said transmitted allocation data to an allocation code stored within an EEPROM, upon a favorable comparison control data is transmitted from said portable, programmable RF transponder to said reading device and stored within RAM memory;

programming a transmission device within said reading device with said control data to transmit a predetermined number of active bits within a predetermined format;

transmitting unaltered authorization data from said portable, programmable RF transponder to a central evaluation unit via a first data communication line, said authorization data consisting of a predetermined number of active bits within the predetermined format; and comparing said received authorization data with check data, upon a favorable comparison, said central evaluation unit instructing a locking device, assigned to the one area, via a second data communication line, to provide access to the one area.

* * * * *